United States Patent
Lee et al.

(10) Patent No.: US 7,158,101 B2
(45) Date of Patent: Jan. 2, 2007

(54) PDP DRIVING DEVICE AND METHOD

(75) Inventors: Jun-Young Lee, Cheonan (KR); Jin-Sung Kim, Anyang (KR)

(73) Assignee: Samsung SDI Co., Ltd, Suwon-si (KR)

( * ) Notice: Subject to any disclaimer, the term of this patent is extended or adjusted under 35 U.S.C. 154(b) by 8 days.

(21) Appl. No.: 11/155,861

(22) Filed: Jun. 16, 2005

(65) Prior Publication Data

US 2005/0231443 A1 Oct. 20, 2005

Related U.S. Application Data

(62) Division of application No. 10/373,605, filed on Feb. 24, 2003, now Pat. No. 6,924,779.

(30) Foreign Application Priority Data

Mar. 18, 2002 (KR) ............... 2002-0014480
Apr. 3, 2002 (KR) ............... 2002-0018266

(51) Int. Cl.
G09G 3/28 (2006.01)
G09G 3/10 (2006.01)

(52) U.S. Cl. ............... 345/60; 315/169.3; 315/169.4

(58) Field of Classification Search ............... 345/50, 345/51, 55, 60, 63, 68–70, 77, 204, 212; 315/169.1, 169.2, 169.3, 169.4

See application file for complete search history.

(56) References Cited

U.S. PATENT DOCUMENTS

| | | | |
|---|---|---|---|
| 4,866,349 A | 9/1989 | Weber et al. | |
| 5,081,400 A | 1/1992 | Weber et al. | |
| 6,111,555 A | 8/2000 | Haas | |
| 6,175,192 B1 | 1/2001 | Moon | |
| 6,538,627 B1 | 3/2003 | Whang et al. | |
| 6,657,604 B1 | 12/2003 | Huang et al. | |
| 6,693,608 B1 * | 2/2004 | Liu et al. | 345/60 |
| 6,924,779 B1 * | 8/2005 | Lee et al. | 345/60 |
| 6,963,174 B1 * | 11/2005 | Lee et al. | 315/169.3 |
| 7,027,010 B1 * | 4/2006 | Lee | 345/60 |
| 2002/0041275 A1 | 4/2002 | Mccormack | |
| 2003/0169243 A1 * | 9/2003 | Lee | 345/204 |
| 2003/0222591 A1 * | 12/2003 | Kim et al. | 315/169.1 |
| 2005/0116894 A1 * | 6/2005 | Lee et al. | 345/60 |
| 2006/0103325 A1 * | 5/2006 | Kim | 315/169.4 |

* cited by examiner

Primary Examiner—Tan Ho
(74) Attorney, Agent, or Firm—Christie, Parker & Hale LLP

(57) ABSTRACT

In a PDP driving circuit, first and second inductors are coupled to a panel capacitor. The driving circuit stores a first energy in the first inductor through a current in the first direction while the voltage at the panel capacitor is maintained to be a first voltage, and uses the first energy and resonance between the panel capacitor and the first inductor to reduce the voltage at the panel capacitor to a second voltage. Next, the driving circuit maintains the voltage at the panel capacitor to be the second voltage, recovers the energy remaining in the first inductor, stores a second energy in a second inductor through a current in the second direction, and uses the energy stored in the second inductor to increase the voltage at the panel capacitor to the first voltage. Therefore, rising and falling time of the voltage at the panel capacitor is shortened, and zero-voltage switching is possible when the driving circuit has a parasitic component.

8 Claims, 15 Drawing Sheets

PDP DRIVING DEVICE AND METHOD

CROSS REFERENCE TO RELATED APPLICATIONS

This application is a divisional of U.S. application Ser. No. 10/373,605, filed Feb. 24, 2003 now U.S. Pat. No. 6,924,779, which claims priority to and the benefit of Korea Patent Applications No. 2002-14480 filed on Mar. 18, 2002 and No. 2002-18266 filed on Apr. 3, 2002 in the Korean Intellectual Property Office, priority of which are hereby claimed.

BACKGROUND OF THE INVENTION (a) Field of the Invention

The present invention relates to a device and method for driving a plasma display panel (PDP). More specifically, the present invention relates to a PDP sustain-discharge circuit or an address driving circuit.

(b) Description of the Related Art

In general, a PDP is a flat plate display for displaying characters or images using plasma generated by gas discharge. Pixels ranging from hundreds of thousands to more than millions are arranged in a matrix form according to the size of the PDP. PDPs are categorized as direct current (DC) PDPs and alternating current (AC) PDPs according to patterns of the waveforms of applied driving voltages and structures of discharge cells.

Current directly flows in discharge spaces while a voltage is supplied to the DC PDP, because electrodes of the DC PDP are exposed to the discharge spaces. Therefore, a resistor for restricting the current must be provided to the DC PDP. On the other hand, in the case of the AC PDP, the current is restricted due to the natural formation of a capacitance component because a dielectric layer covers the electrodes. The AC PDP has a longer life than the DC PDP, since the electrodes are protected against shock caused by ions during discharge.

In general, a method for driving the AC PDP includes a reset period, an addressing period, a sustain period, and an erase period.

In the reset period, the states of the respective cells are reset in order to smoothly address the cells. In the addressing period, the cells that are turned on and the cells that are not turned on in a panel are selected, and wall charges are accumulated to the cells that are turned on (i.e., the addressed cells). In the sustain period, discharge is performed in order to actually display pictures on the addressed cells. In the erase period, the wall charges of the cells are reduced to thereby terminate sustain-discharge.

In the AC PDP, since a panel between an address electrode, a sustain electrode, and a scan electrode operates as a capacitive load, it is generally referred to as a panel capacitor. Reactive power is required in order to apply waveforms for the addressing or the sustain-discharge because of capacitance of the panel capacitor. A circuit for recovering and re-using the reactive power is referred to as a power recovery circuit. L. F. Weber discloses the power recovery circuits in the U.S. Pat. Nos. 4,866,349 and 5,081,400.

However, the conventional power recovery circuit only uses resonance between a panel capacitor and an inductor coupled to the panel capacitor, and it normally operates only when a power recovery capacitor is charged with a voltage corresponding to half external power. Since the conventional power recovery circuit has a loss generated from itself, such as a switch's conduction loss and switching loss, during the recovery process it fails to recover the entire energy. Accordingly, since a panel voltage may not be increased or decreased to a desired voltage level, switches problematically perform hard switching to thereby generate power loss, and rising time and falling time of the panel voltage becomes longer.

SUMMARY OF THE INVENTION

In accordance with the present invention a PDP driving circuit for power recovery is provided. Rising time and falling time of the panel voltage are reduced, and zero-voltage switching is executed. The present invention stores energy in an inductor, and uses the stored energy to vary the panel voltage.

In one aspect of the present invention, a device for driving a PDP, the PDP having a plurality of address electrodes, scan electrodes, sustain electrodes, and panel capacitors each formed between the address, scan, and sustain electrodes, includes: first and second capacitors coupled in series between first and second power sources for respectively providing first and second voltages; first and second switches coupled in parallel to a point where the first and second capacitors meet; third and fourth switches coupled in series between the first and second power sources, a point where the third and fourth switches meet being coupled to the panel capacitor; and first and second inductors respectively coupled between the first switch and a point where the third and fourth switches meet, and between the second switch and the point where the third and fourth switches meet.

The device further includes: a fifth switch coupled between the first inductor and the second power source; and a sixth switch coupled between the first power source and the first inductor.

In another aspect of the present invention, a device for driving a PDP, the PDP having a plurality of address electrodes, scan electrodes, sustain electrodes, and panel capacitors each formed between the address, scan, and sustain electrodes, includes: a first switch having a first end coupled to a first power source for supplying a first voltage; a first diode coupled between a second power source for supplying a second voltage and a second end of the first switch; a second switch coupled between the panel capacitor and a point where the first switch and the first diode meet; an inductor and a third switch coupled in series between the second power source and the point where the first switch and the first diode meet; a second diode coupled between a point where the inductor and the third switch meet and a point where the second switch and the panel capacitor meet; and a third diode coupled between the first power source and the point where the second switch and the panel capacitor meet.

In still another aspect of the present invention, a device for driving a PDP, the PDP having a plurality of address electrodes, scan electrodes, sustain electrodes, and panel capacitors each formed between the address, scan, and sustain electrodes, includes: a discharge unit, including a first inductor coupled to the panel capacitor, for storing a first energy in the first inductor using the current in a first direction while the voltage at the panel capacitor maintains a first voltage, using the first energy and the resonance between the panel capacitor and the first inductor to reduce the voltage at the panel capacitor to a second voltage, and recovering the energy remaining in the first inductor while maintaining the voltage at the panel capacitor to be the second voltage; and a charge unit, including a second inductor coupled to the panel capacitor, for storing a second energy in the second inductor using the current in a second direction while the voltage at the panel capacitor maintains the second voltage, using the second energy and the resonance between the panel capacitor and the second inductor to raise the voltage at the panel capacitor to the first voltage, and recovering the energy remaining in the second inductor while maintaining the voltage at the panel capacitor to be the first voltage.

In still yet another aspect of the present invention, a device for driving a PDP, the PDP having a plurality of address electrodes, scan electrodes, sustain electrodes, and panel capacitors each formed between the address, scan, and sustain electrodes, includes: an inductor coupled to the panel capacitor; and a freewheeling unit for temporarily freewheeling the current flowing to the inductor, wherein energy is stored in the inductor while the voltage at the panel capacitor maintains a first voltage, the energy and the resonance between the panel capacitor and the inductor are used to change the voltage at the panel capacitor to a second voltage, and the energy freewheeled and continuously stored in the inductor during the maintaining of the second voltage is used to change the voltage at the panel capacitor to the first voltage.

In still yet another aspect of the present invention, a device for driving a PDP, the PDP having a plurality of address electrodes, scan electrodes, sustain electrodes, and panel capacitors each formed between the address, scan, and sustain electrodes, includes: first and second inductors coupled to the panel capacitor; first and second signal lines for respectively transmitting first and second voltages; a capacitor for charging a third voltage; a first current path formed between the first signal line and the capacitor so that a current in the first direction is supplied to the first inductor to store a first energy, while the voltage at the panel capacitor is maintained to be the first voltage; a second current path for generating resonance between the first inductor and the panel capacitor, and using the first energy and the resonance to reduce the voltage at the panel capacitor to a second voltage, while the first energy is stored in the first inductor; a third current path for recovering the energy remaining in the first inductor while the voltage at the panel capacitor is changed to the second voltage; a fourth current path formed between the capacitor and the second signal line so that a current in the second direction opposite the first direction may be supplied to the second inductor to store a second energy, while the voltage at the panel capacitor is maintained to be the second voltage; a fifth current path for generating resonance between the second inductor and the panel capacitor, and using the second energy and the resonance to increase the voltage at the panel capacitor to the first voltage, while the second energy is stored in the second inductor; and a sixth current path for recovering the energy remaining in the second inductor while the voltage at the panel capacitor is changed to the first voltage.

In still yet another aspect of the present invention, a device for driving a PDP, the PDP having a plurality of address electrodes, scan electrodes, sustain electrodes, and panel capacitors each formed between the address, scan, and sustain electrodes, includes: an inductor coupled to the panel capacitor; first and second signal lines for transmitting first and second voltages; a first current path formed between the first and the second signal lines so that the current may be supplied to the inductor to store a first energy, while the voltage at the panel capacitor is maintained to be the first voltage; a second current path for generating resonance between the inductor and the panel capacitor while the first energy is stored in the inductor, and using the first energy and the resonance to reduce the voltage at the panel capacitor to a second voltage; at least one third current path for freewheeling the current flowing to the inductor so as to maintain the second energy remaining in the inductor, while the voltage at the panel capacitor is changed to the second voltage; a fourth current path for generating resonance between the inductor and the panel capacitor while the current flowing to the inductor is freewheeled, and using the second energy and the resonance to increase the voltage at the panel capacitor to the first voltage; and a fifth current path for recovering the energy remaining in the inductor while the voltage at the panel capacitor is changed to the first voltage.

DETAILED DESCRIPTION

Figure 1:
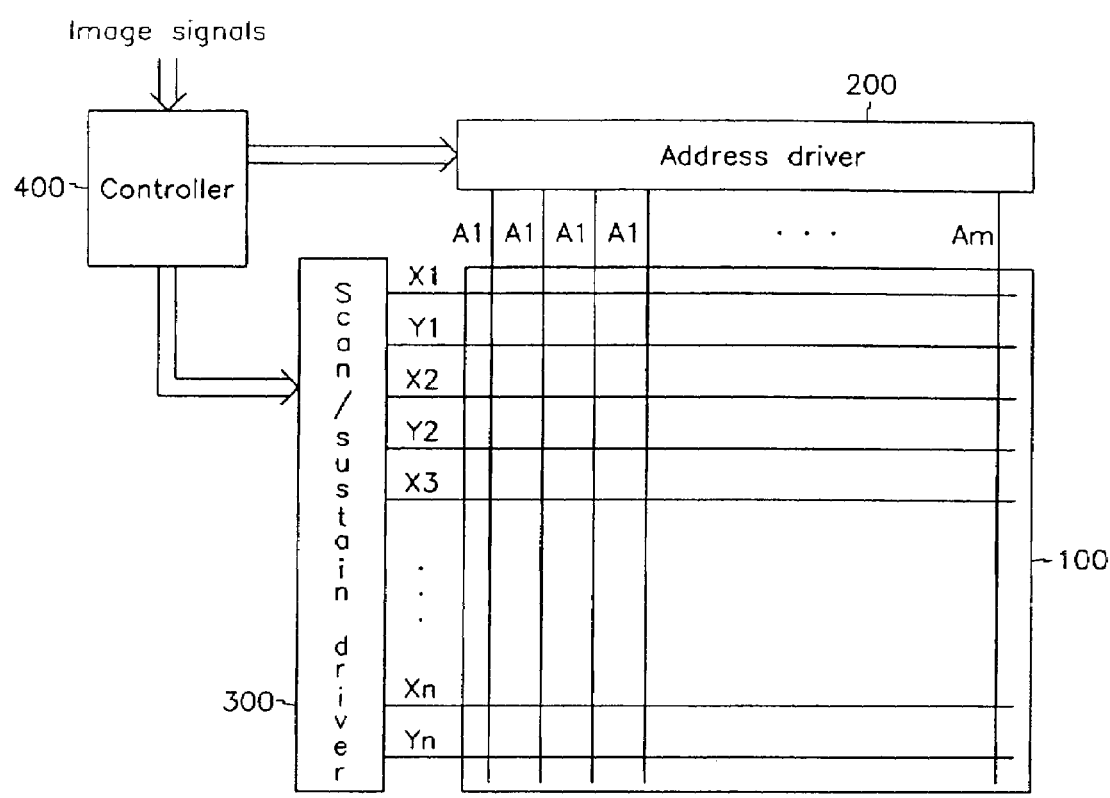
FIG. 1 shows a schematic diagram of a PDP according to an embodiment of the present invention.

FIG. 1 shows a PDP according to an embodiment of the present invention.

As shown, the PDP includes plasma panel 100, address driver 200, scan/sustain driver 300, and controller 400.

Plasma panel 100 includes: a plurality of address electrodes A1 through Am arranged in the column direction; a plurality of scan electrodes Y1 through Yn arranged in the row direction; and a plurality of sustain electrodes X1 through Xn alternately arranged with scan electrodes Y1 through Yn in the row direction. Address driver 200 receives an address driving control signal from controller 400, and supplies a display data signal for selecting a desired discharge cell to each address electrode. Scan/sustain driver 300 receives a sustain-discharge control signal from controller 400, and alternately inputs sustain-discharge voltages to the scan electrodes and the sustain electrodes to thereby perform sustain-discharge on the selected discharge cells. Address driver 200 and scan/sustain driver 300 respectively include a driving circuit (i.e., a power recovery circuit) for recovering and using reactive power. Controller 400 receives external image signals, generates address driving control signals and sustain-discharge control signals, and respectively supplies them to address driver 200 and scan/sustain driver 300.

Figure 2:
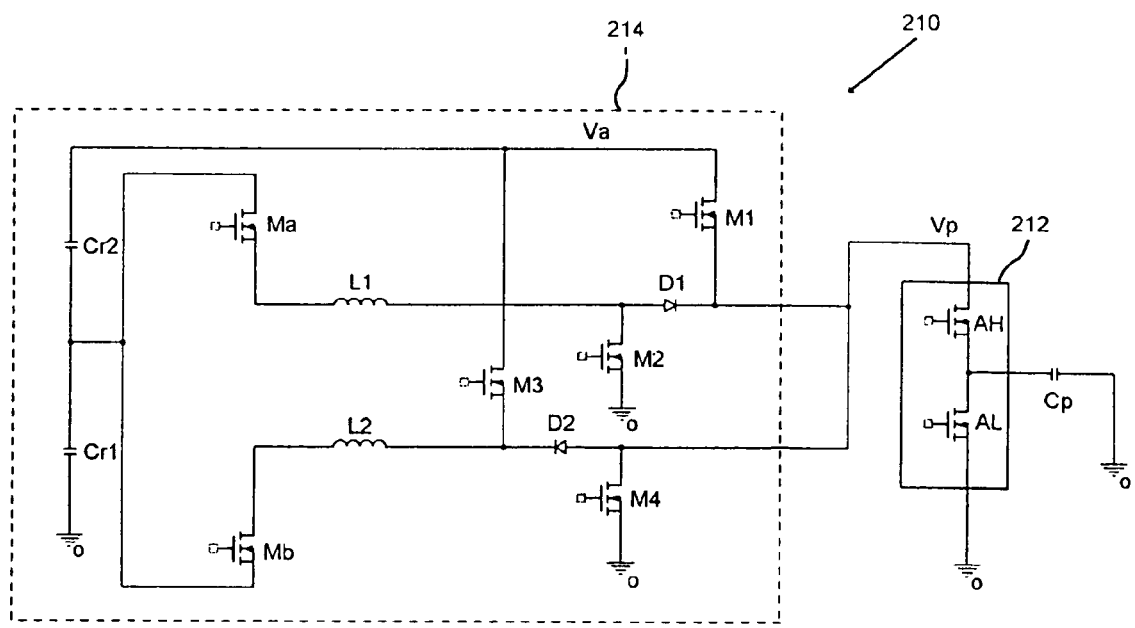
FIG. 2 shows a circuit diagram of a PDP driving circuit according to a first embodiment of the present invention.
Figure 3A:
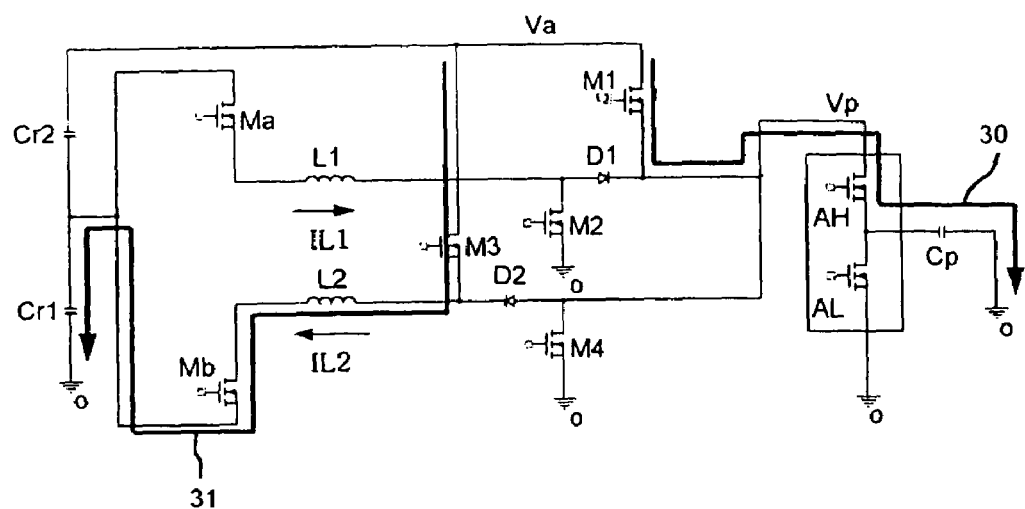
FIGS. 3A through 3E show current paths of respective modes in the driving circuit according to a first embodiment of the present invention.
Figure 3B:
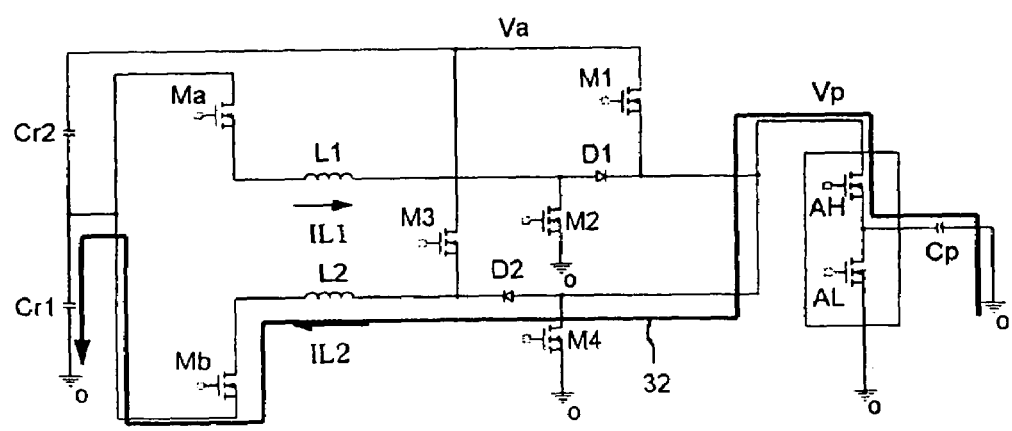
Figure 3C:
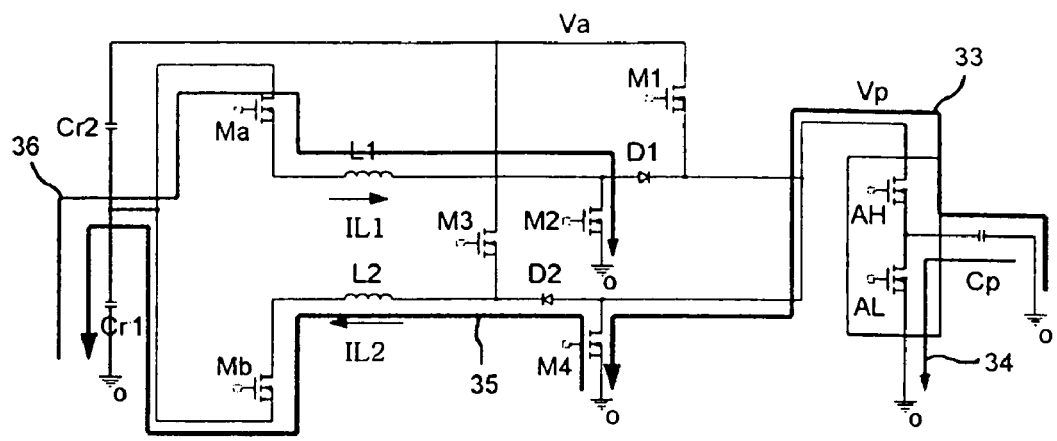
Figure 3D:
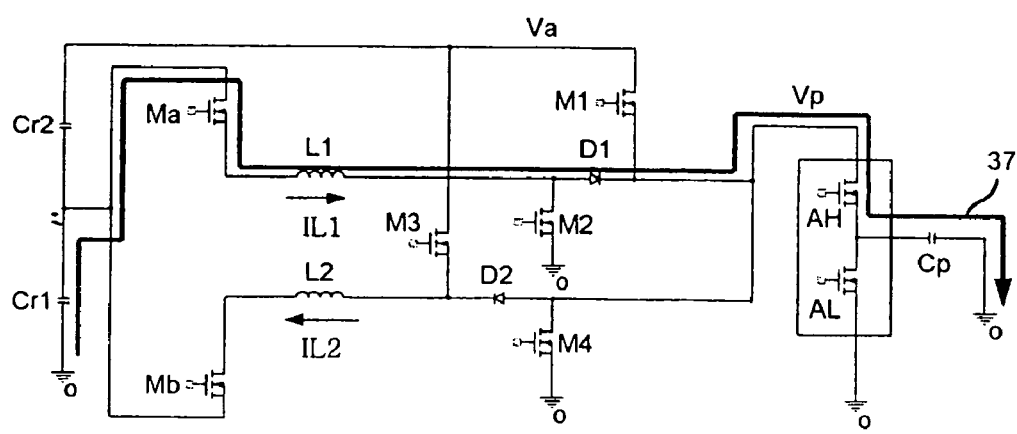
Figure 3E:
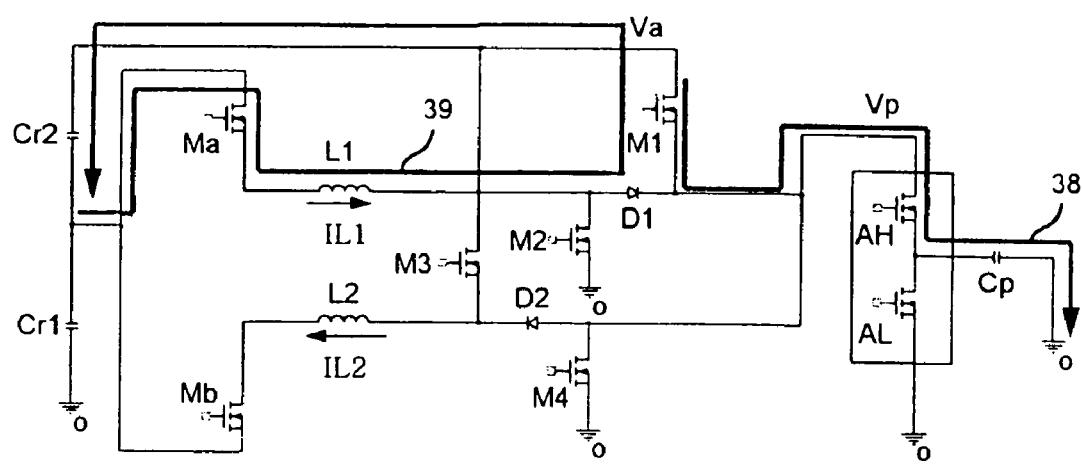
Figure 4:
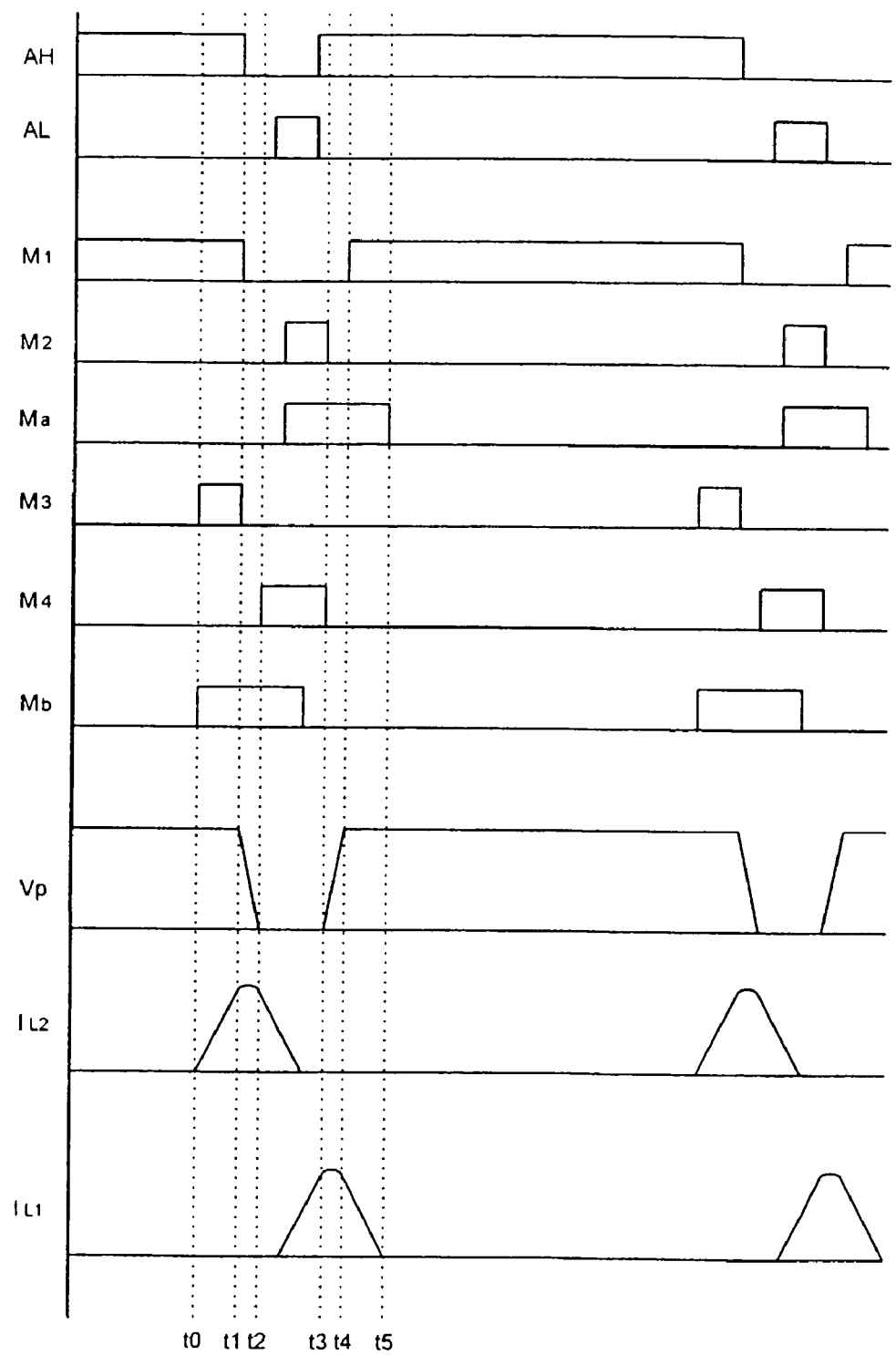
FIG. 4 shows a driving timing diagram of the driving circuit according to a first embodiment of the present invention.

With reference to FIGS. 2 through 4, driving circuit 210 of address driver 200 according to a first embodiment of the present invention will now be described in detail.

FIG. 2 shows a circuit diagram of driving circuit 210 according to the first embodiment of the present invention, FIGS. 3A through 3E show current paths of respective modes in driving circuit 210 according to the first embodiment of the present invention, and FIG. 4 shows a driving timing diagram of driving circuit 210 according to the first embodiment of the present invention.

As shown in FIG. 2, driving circuit 210 includes address unit 212 and charge/discharge unit 214. Address unit 212 is coupled to ground and power source Va for supplying voltage Va, and it includes address switches AH and AL each having a body diode. Voltage Va represents an address voltage for performing addressing. Panel capacitor Cp is provided to a point where address switches AH and AL meet. A switching operation by address switches AH and AL supplies address voltage Va or ground voltage to panel capacitor Cp. A plurality of address units 212 is respectively coupled to a plurality of address electrodes A1 through Am, and address voltage Va is supplied to the address electrodes coupled to address units 212 that have turned-on switch AH.

Charge/discharge unit 214 includes switches M1, M2, M3, and M4, boosting inductors L1 and L2, power recovery switches Ma and Mb, and capacitors Cr1 and Cr2. Switches M1 and M2 are coupled in series between power source Va and ground, and switches M3 and M4 are coupled in series between power source Va and ground, differing from the path of switches M1 and M2. Diodes D1 and D2 for respectively establishing a current path supplied to panel capacitor Cp and a current path recovered from panel capacitor Cp may be provided between switches M1 and M2, and between switches M3 and M4.

Boosting inductor L1 is provided between power recovery switch Ma and a point where switches M1 and M2 meet, and boosting inductor L2 is provided between power recovery switch Mb and a point where switches M3 and M4 meet. Capacitors Cr1 and Cr2 are coupled in series between power source Va and ground, and power recovery switches Ma and Mb are coupled to a point provided between capacitors Cr1 and Cr2.

Switches AH, AL, M1, M2, M3, M4, Ma, and Mb are denoted as MOSFETs in FIG. 2, but without being restricted this, any switches that perform functions identical or similar to them may be applied.

Referring to FIGS. 3A through 3E and 4, a PDP driving method according to the first embodiment of the present invention will be described.

In the first embodiment, it is assumed that switches AH and M1 are turned on before the "mode 1" starts, respective voltages V1 and V2 (V2=Va−V1) are charged to capacitors Cr1 and Cr2, and inductances at inductors L1 and L2 are respectively set to be L1 and L2.

(1) Mode 1 (t0 through t1)

Referring to FIG. 3A and an interval (t0 through t1) of FIG. 4, an operation of mode 1 will be described.

In the "mode 1" interval (t0 through t1), switches M3 and Mb are turned on while switches AH and M1 are turned on. As shown in FIG. 3A, when switches AH and M1 are turned on, current path 30 is formed in order of switch M1, switch AH, and panel capacitor Cp, and accordingly, address voltage Va is charged to panel capacitor Cp. Here, when switches M3 and Mb are turned on, current path 31 is formed in order of switch M3, inductor L2, switch Mb, and capacitor Cr1. As shown in FIG. 4, current IL2 that flows to inductor L2 has a gradient of (Va−V1)/L2 according to current path 31, and linearly increases to store energy in inductor L2.

(2) Mode 2 (t1 through t2)

Referring to FIG. 3B and an interval (t1 through t2) of FIG. 4, an operation of mode 2 will be described.

In the "mode 2" interval (t1 through t2), switches AH, M1, and M3 are turned off while switch Mb is turned on. As shown in FIG. 3B, current path 32 is then formed in order of panel capacitor Cp, a body diode of switch AH, inductor L2, switch Mb, and capacitor Cr1. In this instance, a resonance current flows due to inductor L2 and panel capacitor Cp, and accordingly, voltage Vp at panel capacitor Cp falls to ground voltage from address voltage Va.

A process for discharging the voltage charged to the panel capacitor may quickly proceed because of the energy stored in inductor L2. Namely, the falling time (t2−t1) of voltage Vp at panel capacitor Cp reduces. Also, in the actual case of including a parasitic component of a circuit, voltage Vp at panel capacitor Cp may completely reduce to ground voltage due to the energy stored in inductor L2.

(3) Mode 3 (t2 through t3)

Referring to FIG. 3C and an interval (t2 through t3) of FIG. 4, an operation of mode 3 will be described.

In the "mode 3" interval (t2 through t3), switches M4 and AL are sequentially turned on while switch Mb is turned on.

When voltage Vp at panel capacitor Cp becomes ground voltage at t=t2, the body diode of switch M4 conducts. In this instance, when switch M4 is turned on, the voltage between a drain and a source at switch M4 is turned on from the zero-voltage state. That is, since switch M4 performs zero-voltage switching, no turning-on switching loss of switch M4 is generated. Also, switch M4 may perform zero-voltage switching because of the energy stored in inductor L2 when switch M4 has a parasitic component of the circuit.

As shown in FIG. 3C, when switch M4 is turned on, current path 33 is formed in order of panel capacitor Cp, the body diode of switch AH, and switch M4, and accordingly, voltage Vp at panel capacitor Cp is sustained to be ground voltage. Also, when switch AL is turned on, current path 34 is formed in order of panel capacitor Cp and switch AL, and accordingly, voltage Vp at panel capacitor Cp is sustained to be ground voltage.

Further, current path 35 is formed in order of the body diode of switch M4, inductor L2, switch Mb, and capacitor Cr1. The current flowing to inductor L2 has a gradient of −V1/L2 and linearly reduces to zero because of current path 35. That is, the energy stored in inductor L2 is recovered to capacitor Cr1 through switch Mb.

Next, when switches Ma and M2 are turned on while switches Mb, AL, and M4 are turned on, current path 36 is formed in order of capacitor Cr1, switch Ma, inductor L1, and switch M2, and the current flowing to inductor L1 has a gradient of V1/L1 and linearly increases because of current path 36 to thereby store energy in inductor L1.

Before the mode 3 is finished, switches Mb and AL are sequentially turned off, and switch AH is turned on.

(4) Mode 4 (t3 through t4)

Referring to FIG. 3D and the interval (t3 through t4) of FIG. 4, an operation of "mode 4" will now be described.

In the "mode 4" interval (t3 through t4), switches M2 and M4 are turned off while switches AH and Ma are turned on. As shown in FIG. 3D, current path 37 is formed in order of capacitor Cr1, switch Ma, inductor L1, switch AH, and panel capacitor Cp. In this instance, since resonance current flows because of inductor L1 and panel capacitor Cp, voltage Vp at panel capacitor Cp increases to address voltage Va from ground voltage.

The process for charging the voltage to the panel capacitor may quickly proceed due to the energy stored in inductor L1. That is, the rising time (t4–t3) of voltage Vp at panel capacitor Cp reduces. Also, voltage Vp at panel capacitor Cp may completely increase to address voltage Va because of the energy stored in inductor L1 when a parasitic component of a circuit is provided.

(5) Mode 5 (t4 through t5)

In the "mode 5" (t4 through t5), switch M1 is turned on while switches AH and Ma are turned on.

When voltage Vp at panel capacitor Cp reaches address voltage Va at t=t4, the body diode of switch M1 conducts. In this instance, when switch M1 is turned on, the voltage between the drain and the source at switch M1 is turned on from the zero-voltage state. That is, since switch M1 performs zero-voltage switching, no turning-on switching loss by switch M1 is generated.

As shown in FIG. 3E, when switch M1 is turned on, current path 38 is formed in order of switch M1, switch AH, and panel capacitor Cp to thereby maintain voltage Vp at panel capacitor Cp to be address voltage Va. Also, another current path 39 is formed in order of switch Ma, inductor L1, the body diode of switch M1, and capacitor Cr2. Current IL1 flowing to inductor L1 has a gradient of $-V2/L1$ and linearly reduces to zero because of current path 39. That is, the energy stored in inductor L1 is recovered to capacitor Cr2 through the body diode of switch M1.

According to the first embodiment of the present invention described above, the current is stored in the inductor in the modes 1 and 3 which are prior to charging the voltage to panel capacitor Cp (Mode 4) and discharging the same from panel capacitor Cp (Mode 2), and the stored energy is used so that voltage Vp at panel capacitor Cp may quickly rise to address voltage Va or fall to ground voltage, and when a parasitic component of the circuit is provided, voltage Vp may completely rise to the address voltage or completely fall to ground voltage. Also, the energy stored in the inductor may be recovered in the modes 3 and 5 and reused.

With reference to FIGS. 5, 6A through 6E, and 7, a driving circuit and a PDP driving method according to a second embodiment of the present invention will be described.

Figure 5:
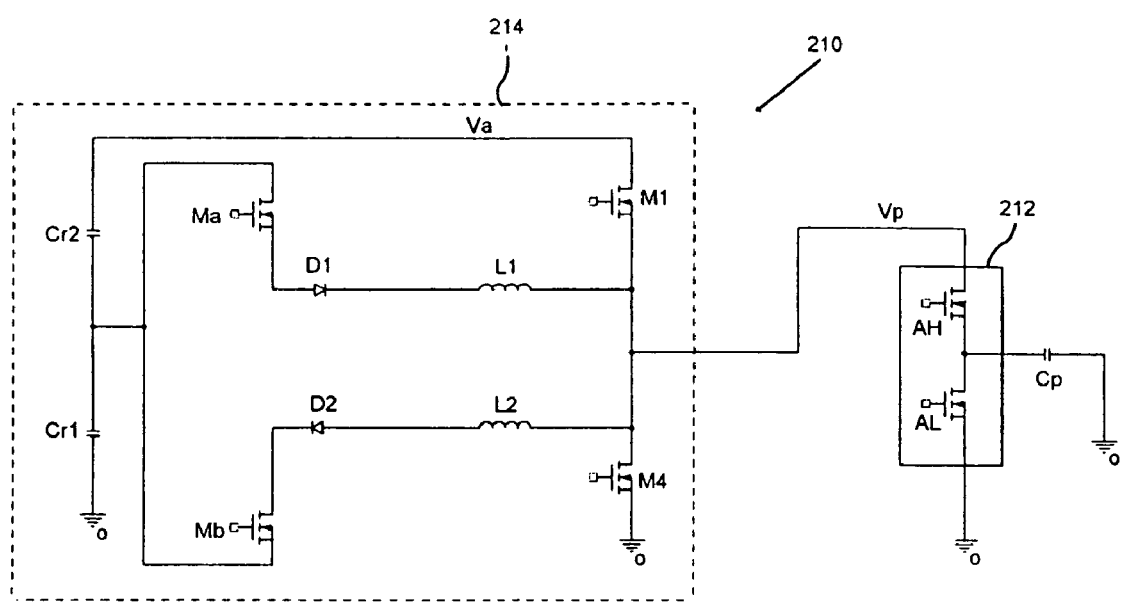
FIG. 5 shows a circuit diagram of a PDP driving circuit according to a second embodiment of the present invention.
Figure 6A:
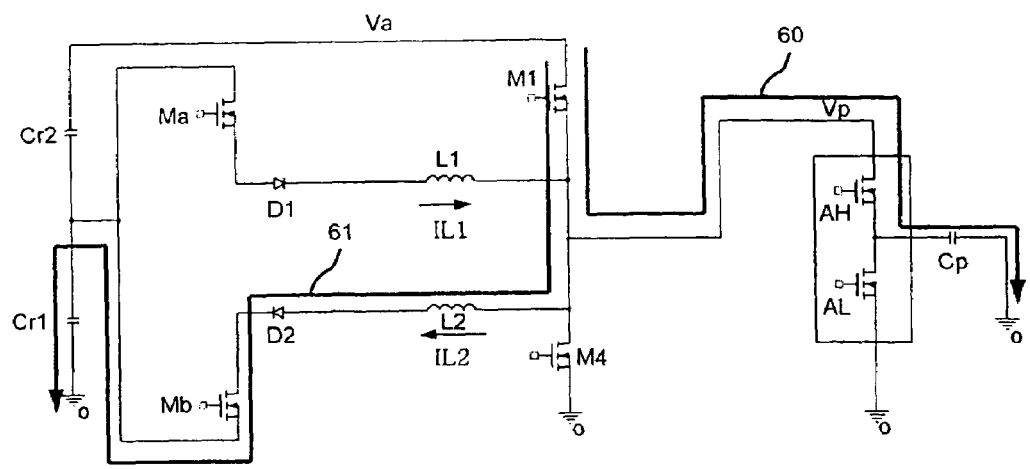
FIGS. 6A through 6E show current paths of respective modes in the driving circuit according to a second embodiment of the present invention.
Figure 6B:
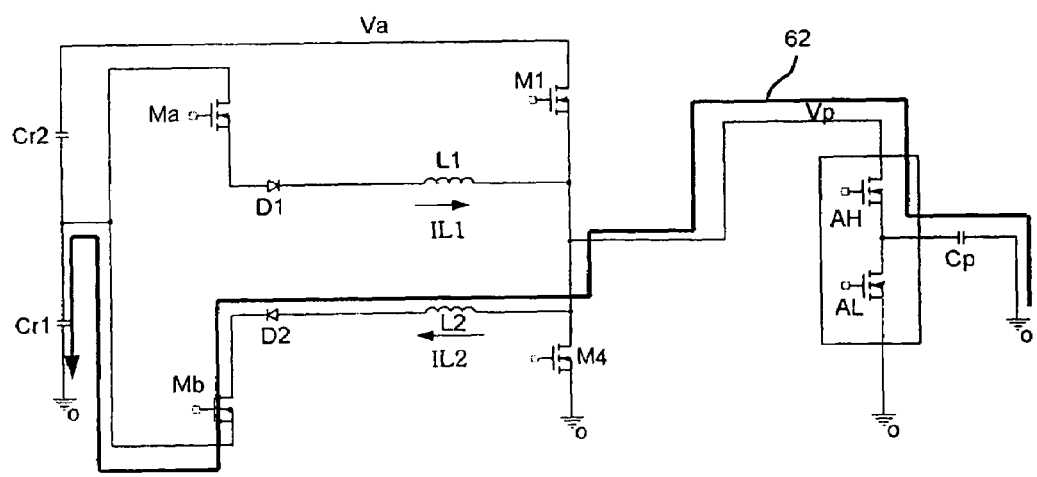
Figure 6C:
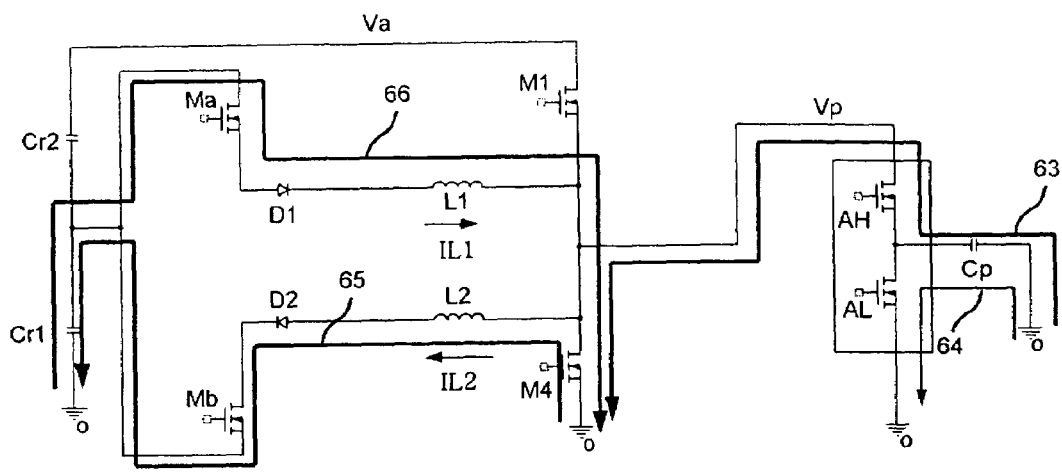
Figure 6D:
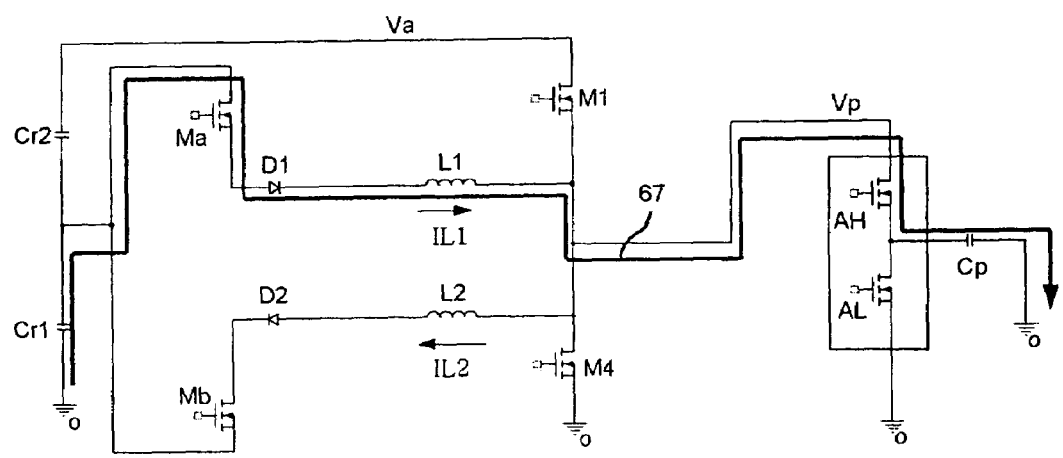
Figure 6E:
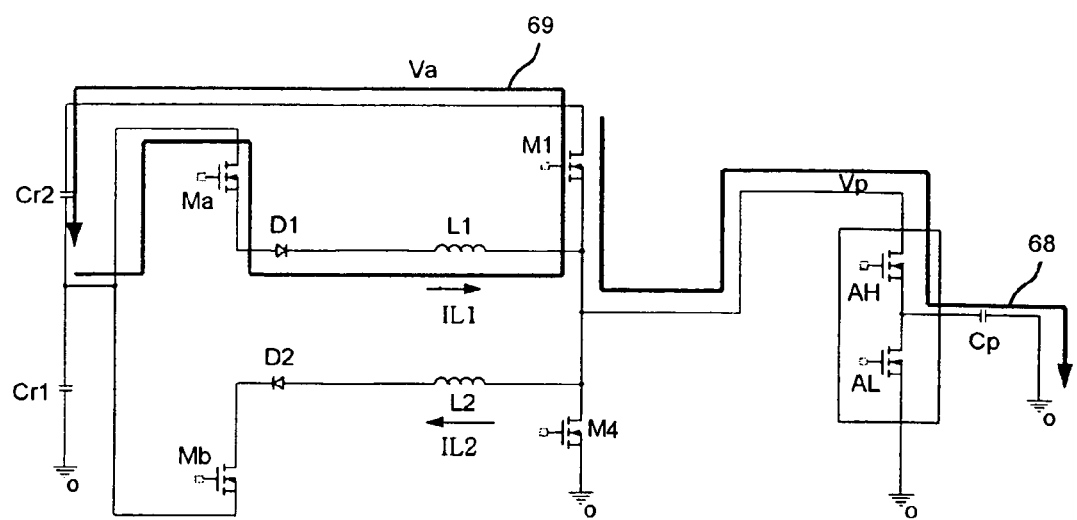
Figure 7:
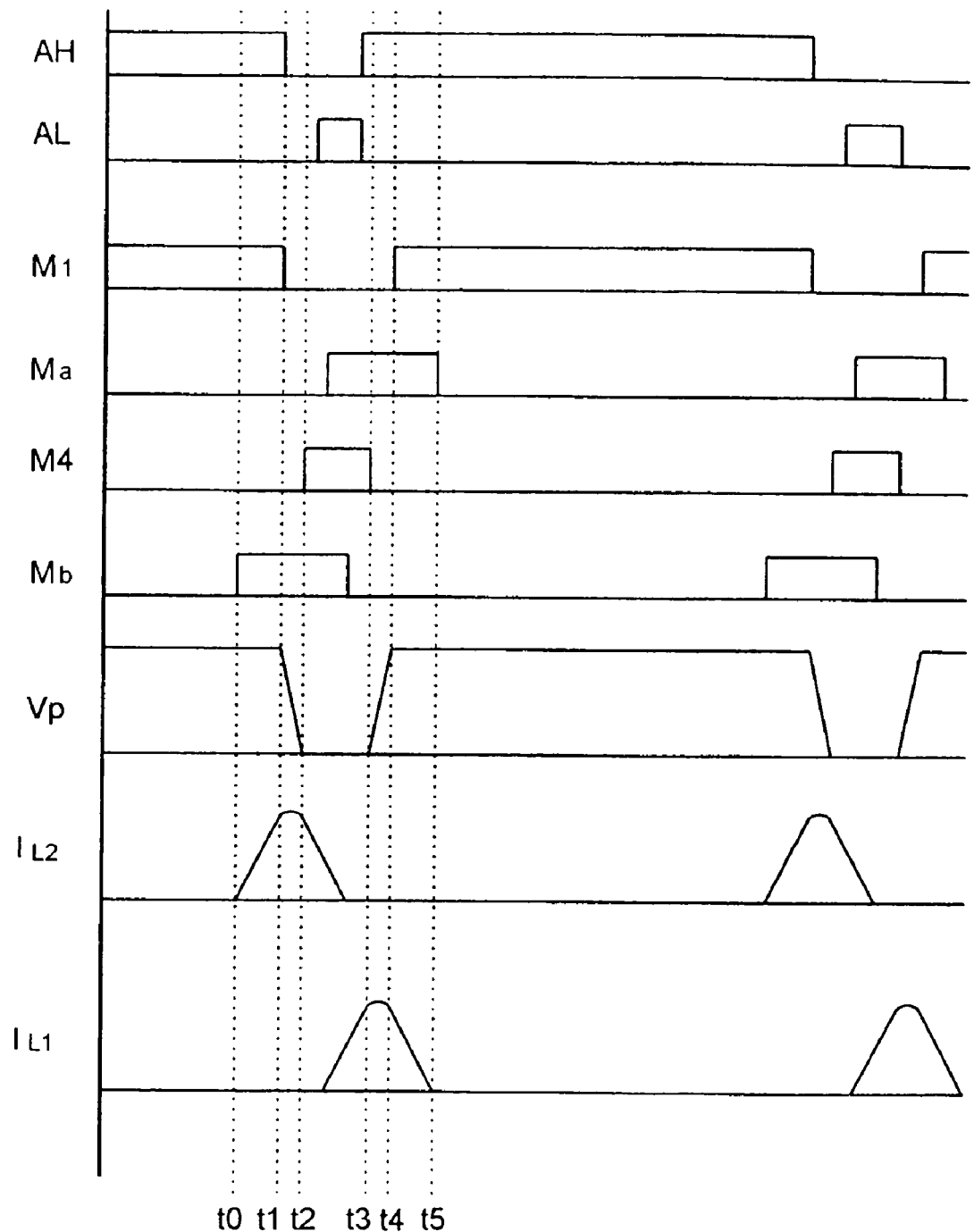
FIG. 7 shows a driving timing diagram of the driving circuit according to a second embodiment of the present invention.

FIG. 5 shows a circuit diagram of a PDP driving circuit according to the second embodiment of the present invention, FIGS. 6A through 6E show current paths of respective modes in the driving circuit according to the second embodiment of the present invention, and FIG. 7 shows a driving timing diagram of the driving circuit according to the second embodiment of the present invention.

As shown in FIG. 5, driving circuit 210 has a circuit identical with that of the first embodiment excluding switches M2 and M3 shown in FIG. 2.

In detail, switches M1 and M4 of charge/discharge unit 214 according to the second embodiment are coupled in series between power source Va and ground, and address unit 212 is coupled to a point where switches M1 and M4 meet. Inductor L1 is provided between power recovery switch Ma and the point provided between switches M1 and M4, and inductor L2 is provided between power recovery switch Mb and the point provided between switches M1 and M4. Diodes D1 and D2 for respectively forming a current path may be further provided between inductor L1 and switch Ma, and between inductor L2 and switch Mb.

Referring to FIGS. 6A through 6E, and 7, a PDP driving method according to the second embodiment of the present invention will now be described.

In the second embodiment, it is assumed in the like manner of the first embodiment that switches AH and M1 are turned on before the mode 1 starts, and voltages V1 and V2 (=Va−V1) are charged to capacitors Cr1 and Cr2.

(1) Mode 1 (t0 through t1)

In the "mode 1" interval (t0 through t1), switch Mb is turned on while switches AH and M1 are turned on. As shown in FIG. 6A, when switches AH and M1 are turned on, current path 60 is formed, and address voltage Va is charged to panel capacitor Cp. Here, when switch Mb is turned on, current path 61 is formed, and current IL2 that flows to inductor L2 has a gradient of $(Va-V1)/L2$ and linearly increases to store energy in inductor L2.

(2) Mode 2 (t1 through t2)

In the "mode 2" interval (t1 through t2), switches AH and M1 are turned off while switch Mb is turned on. As shown in FIG. 6B, current path 62 is then formed, and a resonance current flows due to inductor L2 and panel capacitor Cp, and accordingly, voltage Vp at panel capacitor Cp falls to ground voltage from address voltage Va.

(3) Mode 3 (t2 through t3)

In the "mode 3" interval (t2 through t3), switches M4 and AL are sequentially turned on while switch Mb is turned on. As shown in FIG. 6C, current paths 63 and 64 are formed, and voltage Vp at panel capacitor Cp is sustained to be ground voltage. Also, current path 65 is formed, current IL2 flowing to inductor L2 has a gradient of $-V1/L2$ and linearly reduces to zero, and hence, the energy stored in inductor L2 is recovered to capacitor Cr1 through switch Mb.

In this instance, since voltage Vp at panel capacitor Cp becomes ground voltage, and switch M4 is turned on while the body diode of switch M4 conducts, no turning-on switching loss by switch M4 is generated.

Next, when switch Ma is turned on while switches Mb, M4, and AL are turned on, current path 66 is formed, and the current flowing to inductor L1 has a gradient of $V1/L1$ and linearly increases to thereby store energy in inductor L1.

Before the mode 3 is finished, switches Mb and AL are sequentially turned off, and switch AH is turned on.

(4) Mode 4 (t3 through t4)

In the "mode 4" interval (t3 through t4), switch M4 is turned off while switches AH and Ma are turned on. As shown in FIG. 6D, current path 67 is formed, and since resonance current flows because of inductor L1 and panel capacitor Cp, voltage Vp at panel capacitor Cp rises to address voltage Va from ground voltage.

(5) Mode 5 (t4 through t5)

In the mode 5 (t4 through t5), switch M1 is turned on while switches AH and Ma are turned on. As shown in FIG. 6E, current path 68 is then formed to thereby maintain voltage Vp at panel capacitor Cp to be address voltage Va.

In this instance, since voltage Vp at panel capacitor Cp becomes address voltage Va, and switch M1 is turned on while the body diode of switch M1 conducts, no turning-on switching loss by switch M1 is generated.

Also, another current path 69 is formed, and current IL1 flowing to inductor L1 has a gradient of $-V2/L1$ and linearly reduces to zero. That is, the energy stored in inductor L1 is recovered to capacitor Cr2 through the body diode of switch M1.

According to the second embodiment of the present invention described above, the current is stored in the inductor in the modes 1 and 3 which are prior to charging the voltage to panel capacitor Cp (Mode 4) and discharging the same from panel capacitor Cp (Mode 2), and the stored energy is used so that voltage Vp at panel capacitor Cp may quickly rise to address voltage Va or fall to ground voltage, thereby reducing the rising and falling time. Also, the energy stored in the inductor may be recovered in the modes 3 and 5 and reused.

A PDP address driving circuit is exemplified for the driving circuit according to the first and second embodiments, and a driving circuit of an element having a capacitive load may also be used. For example, it may be applied to a driving circuit of the sustain electrodes and a driving circuit of the scan electrodes of scan/sustain driver 300.

Different inductors are used so as to charge and discharge panel capacitor Cp in the first and second embodiments, and a single inductor may be used to charge and discharge panel capacitor Cp. A third embodiment will be subsequently described referring to FIGS. 8, 9A through 9E, and 10.

Figure 8:
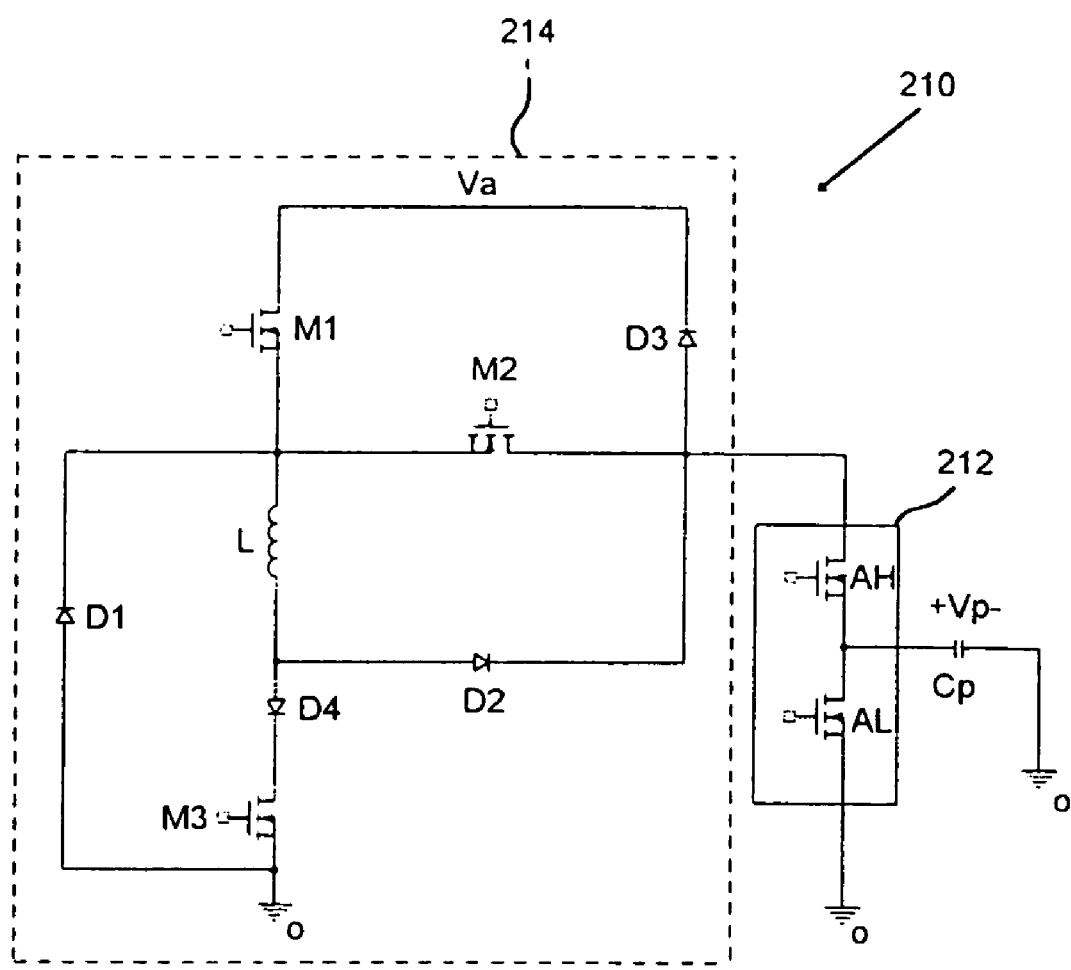
FIG. 8 shows a circuit diagram of a PDP driving circuit according to a third embodiment of the present invention.
Figure 9A:
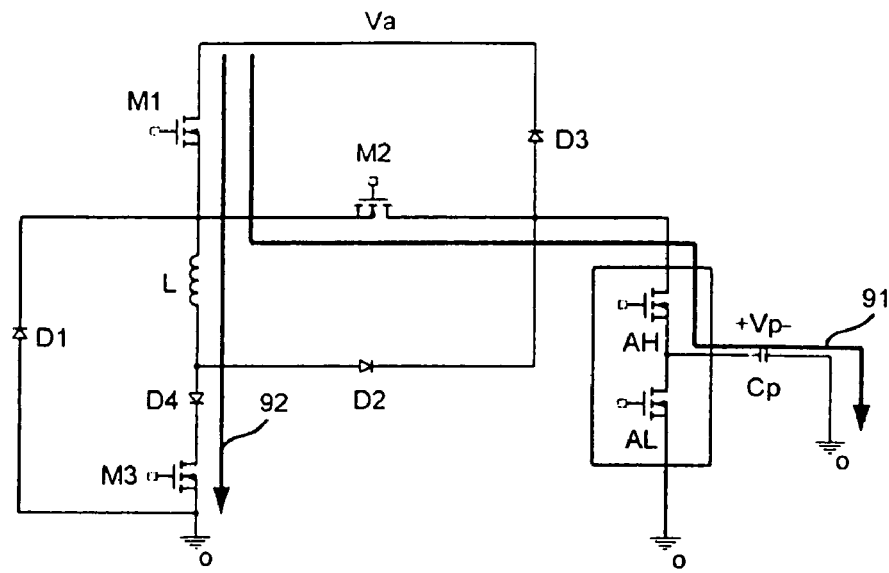
FIGS. 9A through 9E show current paths of respective modes in the driving circuit according to a third embodiment of the present invention.
Figure 9B:
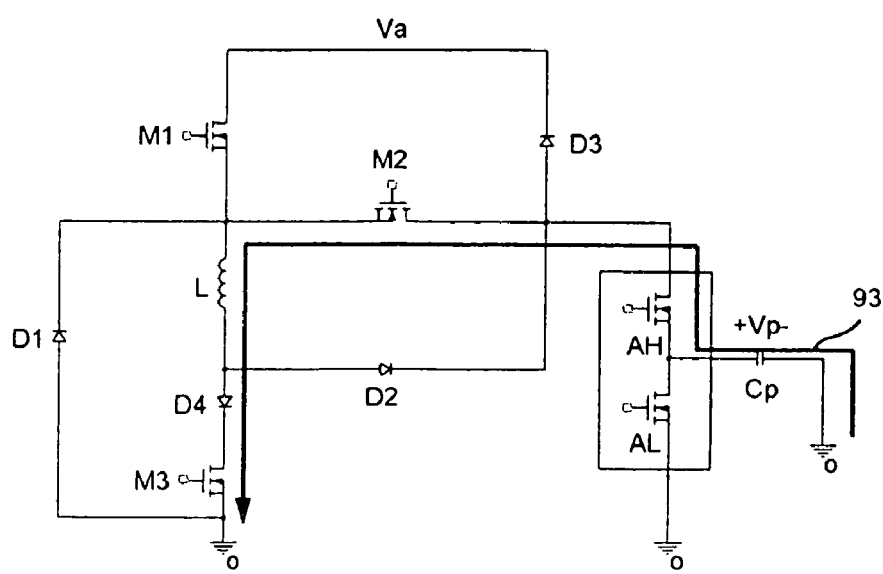
Figure 9C:
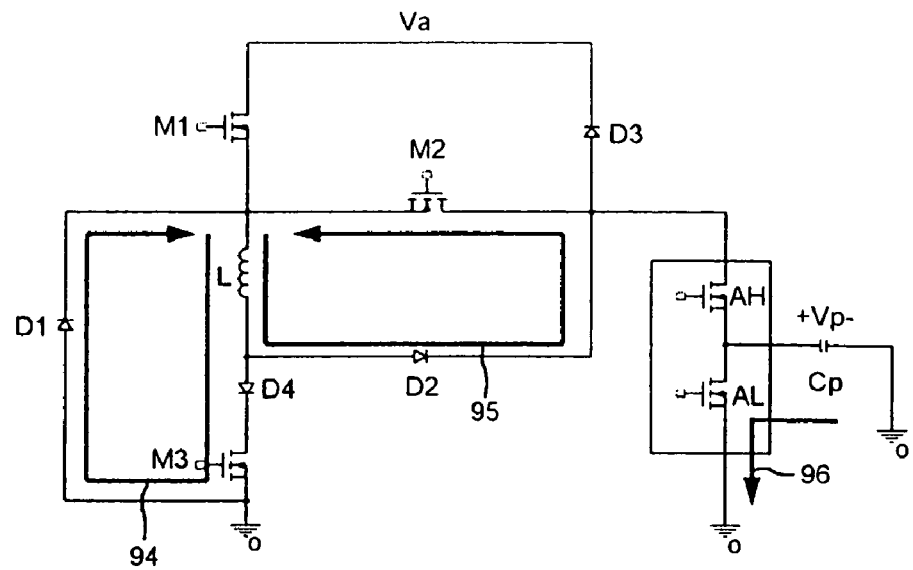
Figure 9D:
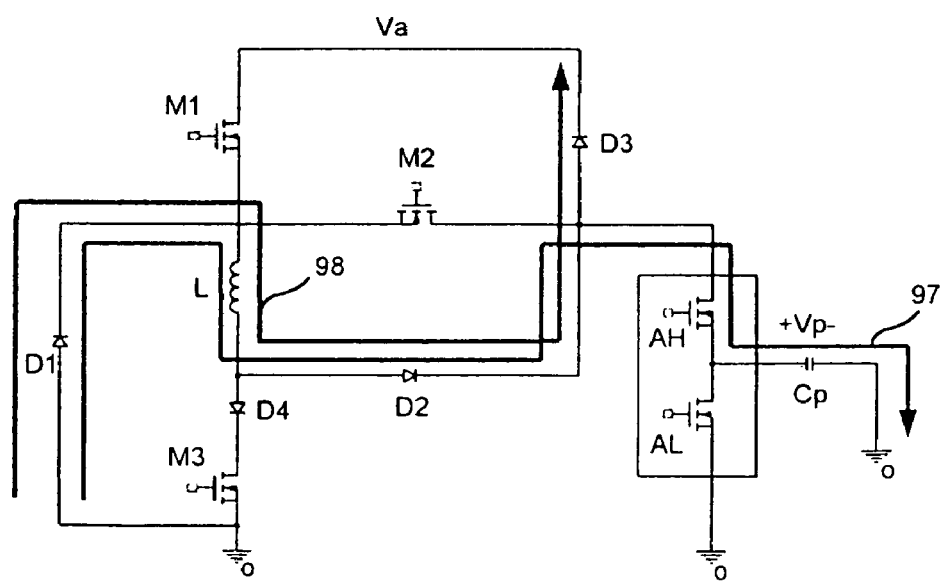
Figure 9E:
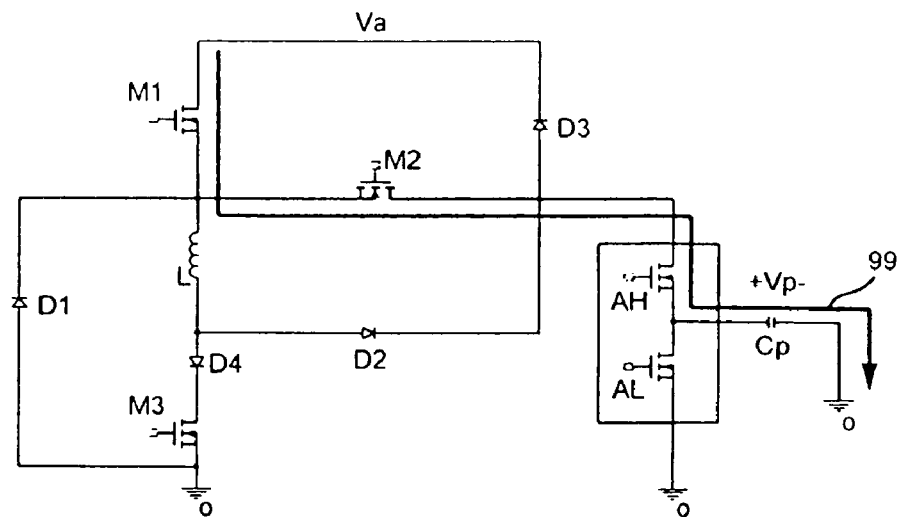
Figure 10:
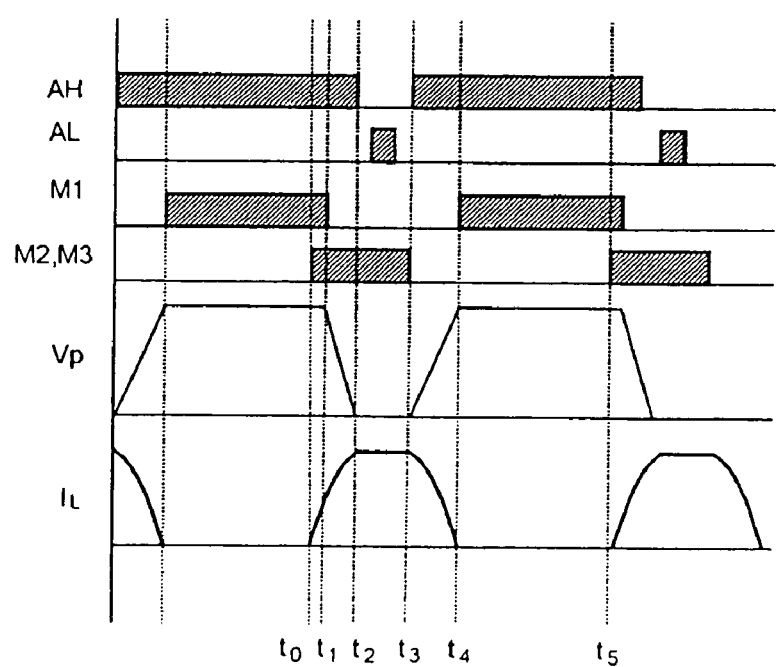
FIG. 10 shows a driving timing diagram of the driving circuit according to a third embodiment of the present invention.

FIG. 8 shows a circuit diagram of a PDP driving circuit according to the third embodiment of the present invention, FIGS. 9A through 9E show current paths of respective modes in the driving circuit according to the third embodiment of the present invention, and FIG. 10 shows a driving timing diagram of the driving circuit according to the third embodiment of the present invention.

With reference to FIG. 8, driving circuit 210 of address driver 200 according to the third embodiment of the present invention will now be described.

As shown, driving circuit 210 includes address unit 212 and charge/discharge unit 214. Since address unit 212 is matched with that of the first embodiment, no corresponding description will be provided.

Charge/discharge unit 214 includes switches M1, M2, and M3, inductor L, freewheeling diodes D1 and D2, and recovery diode D3. Switch M1, inductor L, and switch M3 are coupled in series between power source Va and ground, and diode D1 is coupled between ground and a point where switch M1 and inductor L meet.

Switch M2 is coupled between switch AH of address unit 212 and the point where switch M1 and inductor L meet. Diode D2 is coupled between switch AH and a point where inductor L and switch M3 meet. Diode D3 is coupled between power source Va and a point where switches M2 and AH meet, and it recovers the current flowing to inductor L to power source Va.

In this instance, diode D4 for establishing a current path recovered from panel capacitor Cp may be further provided between inductor L and switch M3.

Referring to FIGS. 9A through 9E and 10, a PDP driving method according to the third embodiment will be described.

In the third embodiment, it is assumed that address voltage Va is charged to panel capacitor Cp before the mode 1 starts, switch M1 and switch AH of the address unit are turned on, and the inductance of inductor L is set to be L.

(1) Mode 1 (t0 through t1)

Referring to FIG. 9A and an interval (t0 through t1) of FIG. 10, an operation of mode 1 will be described.

In the "mode 1" interval (t0 through t1), switches M2 and M3 are turned on while switches M1 and AH are turned on.

As shown in FIG. 9A, when switch M2 is turned on while switches M1 and AH are turned on, current path 91 is formed in order of switch Ml, switch M2, switch AH, and panel capacitor Cp, and accordingly, voltage Vp at panel capacitor Cp maintains address voltage Va. Also, when switch M3 is turned on while switch M1 is turned on, current path 92 is formed in order of switch M1, inductor L, diode D4, and switch M3. Current IL that flows to inductor L has a gradient of Va/L according to current path 91, and linearly increases to thereby store energy in inductor L.

(2) Mode 2 (t1 through t2)

Referring to FIG. 9B and an interval (t1 through t2) of FIG. 10, an operation of mode 2 will be described.

In the "mode 2" interval (t1 through t2), switch M1 is turned off while switches AH, M2, and M3 are turned on. As shown in FIG. 9B, current path 93 is then formed in order of panel capacitor Cp, switch AH, switch M2, inductor L, diode D4, and switch M3. In this instance, an LC resonance current flows due to inductor L and panel capacitor Cp, and accordingly, voltage Vp at panel capacitor Cp falls to ground voltage from address voltage Va, and current IL that flows to inductor L continuously increases.

A process for recovering the voltage charged to panel capacitor Cp may quickly proceed because of the energy stored in inductor L in mode 1. Namely, since the falling time (t2–t1) of voltage Vp at panel capacitor Cp reduces, fast address recovery is possible. Also, in the actual case of including a parasitic component of a circuit, voltage Vp at panel capacitor Cp may completely reduce to ground voltage due to the energy stored in inductor L.

(3) Mode 3 (t2 through t3)

Referring to FIG. 9C and an interval (t2 through t3) of FIG. 10, an operation of mode 3 will be described.

In the "mode 3" interval (t2 through t3), switch AH is turned off and switch AL is turned on while switches M2 and M3 are turned on.

When switch AH is turned off while switches M2 and M3 are turned on, the current flowing to inductor L freewheels to current path 94 in order of inductor L, diode D4, switch M3, and diode D1, and current path 95 in order of inductor L, diode D2, and switch M2 according to freewheeling diodes D1 and D2. Because of the above-noted freewheeling, current IL flowing to inductor L may continuously maintain a predetermined value as shown in FIG. 10.

When switch AL is turned on, current path 96 is formed in order of panel capacitor Cp and switch AL, and accordingly, voltage Vp at panel capacitor Cp is maintained to be ground voltage.

Switch AL is turned off before the mode 3 is finished.

(4) Mode 4 (t3 through t4)

Referring to FIG. 9D and the interval (t3 through t4) of FIG. 10, an operation of "mode 4" will now be described.

In the "mode 4" interval (t3 through t4), switches M2 and M3 are turned off and switch AH is turned on, and as shown in FIG. 9D, current path 97 is formed in order of diode D1, inductor L, diode D2, switch AH, and panel capacitor Cp.

Since resonance current flows on current path 97 because of inductor L and panel capacitor Cp, voltage Vp at panel capacitor Cp rises to address voltage Va from ground voltage. The process for charging the voltage to panel capacitor Cp may quickly proceed due to the energy stored in inductor L. That is, the rising time (t4–t3) of voltage Vp at panel capacitor Cp reduces. Also, voltage Vp at panel capacitor Cp may completely increase to address voltage Va because of the energy stored in inductor L when a parasitic component of a circuit is provided.

When voltage Vp at panel capacitor Cp is charged up to address voltage Va, current path 98 in order of diode D1, inductor L, diode D2, and diode D3 is formed. Current IL flowing to inductor L is recovered to power and reduced to zero because of current path 98.

(5) Mode 5 (t4 through t5)

In the "mode 5" (t4 through t5), switch M1 is turned on while switches AH is turned on. As shown in FIG. 9E, current path 99 is then formed in order of switch M1, body diode of switch M2, switch AH, and panel capacitor Cp to thereby maintain voltage Vp at panel capacitor Cp to be address voltage Va.

After this, the process of mode 1 through mode 5 is repeated, and hence, voltage Vp at panel capacitor Cp is repeatedly switched between address voltage Va and ground voltage.

According to the third embodiment of the present invention described above, voltage Vp at panel capacitor Cp may quickly rise to address voltage Va or fall to ground voltage by storing the current in the inductor and using the stored energy, and when a parasitic component of the circuit is provided, voltage Vp may completely rise to the address voltage or completely fall to ground voltage.

While this invention has been described in connection with what is presently considered to be the most practical embodiments, it is to be understood that the invention is not limited to the disclosed embodiments, but, on the contrary, is intended to cover various modifications and equivalent arrangements included within the spirit and scope of the appended claims.

What is claimed is:

1. A device for driving a plasma display panel having a plurality of address electrodes, scan electrodes, sustain electrodes, and panel capacitors each formed between the address, scan, and sustain electrodes, comprising:
   first and second inductors coupled to the panel capacitor;
   first and second signal lines for respectively transmitting first and second voltages;
   a capacitor for charging a third voltage;
   a first current path formed between the first signal line and the capacitor so that a current in the first direction is supplied to the first inductor to store a first energy, while the voltage at the panel capacitor is maintained to be the first voltage;
   a second current path for generating resonance between the first inductor and the panel capacitor, and using the first energy and the resonance to reduce the voltage at the panel capacitor to the second voltage, while the first energy is stored in the first inductor;
   a third current path for recovering the energy remaining in the first inductor while the voltage at the panel capacitor is changed to the second voltage;
   a fourth current path formed between the capacitor and the second signal line so that a current in the second direction opposite the first direction may be supplied to the second inductor to store a second energy, while the voltage at the panel capacitor is maintained to be the second voltage;
   a fifth current path for generating resonance between the second inductor and the panel capacitor, and using the second energy and the resonance to increase the voltage at the panel capacitor to the first voltage, while the second energy is stored in the second inductor; and
   a sixth current path for recovering the energy remaining in the second inductor while the voltage at the panel capacitor is changed to the first voltage.

2. The device of claim 1, wherein the first signal line is coupled to the panel capacitor so as to maintain the voltage at the panel capacitor to be the first voltage, and the second signal line is coupled to the panel capacitor so as to maintain the voltage at the panel capacitor to be the second voltage.

3. The device of claim 1, further comprising:
   a first switch coupled between the second signal line and a point where the panel capacitor and the first inductor meet, and having a body diode; and
   a second switch coupled between the first signal line and a point where the panel capacitor and the second inductor meet, and having a body diode,
   wherein the first switch is turned on when the voltage at the panel capacitor becomes the second voltage, and the second switch is turned on when the voltage at the panel capacitor becomes the first voltage.

4. The device of claim 3, wherein the third and the sixth current paths are formed through the body diodes of the first and the second switches.

5. A device for driving a plasma display panel having a plurality of address electrodes, scan electrodes, sustain electrodes, and panel capacitors each formed between the address, scan, and sustain electrodes, comprising:
   an inductor coupled to the panel capacitor;
   first and second signal lines for transmitting first and second voltages;
   a first current path formed between the first and the second signal lines so that current may be supplied to the inductor to store a first energy, while the voltage at the panel capacitor is maintained to be the first voltage;
   a second current path for generating resonance between the inductor and the panel capacitor while the first energy is stored in the inductor, and using the first energy and the resonance to reduce the voltage at the panel capacitor to the second voltage;
   at least one third current path for freewheeling the current flowing to the inductor so as to maintain a second energy remaining in the inductor, while the voltage at the panel capacitor is changed to the second voltage;
   a fourth current path for generating resonance between the inductor and the panel capacitor while current flowing to the inductor is freewheeled, and using the second energy and the resonance to increase the voltage at the panel capacitor to the first voltage; and
   a fifth current path for recovering the energy remaining in the inductor while the voltage at the panel capacitor is changed to the first voltage.

6. The device of claim 5, further comprising:
   a first switch coupled between the first signal line and one end of the inductor;
   a second switch coupled between the one end of the inductor and the panel capacitor; and
   a third switch coupled between another end of the inductor and the second signal line,
   wherein the first current path is formed when the first and the third switches are turned on, and the second current path is formed when the second and the third switches are turned on.

7. The device of claim 6, further comprising:
   a first diode coupled between the one end of the inductor and the third switch; and
   a second diode coupled between the other end of the inductor and the second switch,
   wherein the third current path is formed when the second and the third switches are turned on while the second switch is decoupled from the panel capacitor, and it comprises a current path formed through the second switch and the first diode, and a current path formed through the second diode and the third switch.

8. The device of claim 7, further comprising a third diode formed between the second diode and the first signal line, wherein the fourth current path is formed through the first diode, the inductor, and the second diode, and the fifth current path is formed through the first diode, the inductor, and the second and the third diodes, while the first through third switches are turned off.

* * * * *